March 19, 1929.　　R. H. WAPPLER　　1,705,513
SPECULUM
Filed Oct. 30, 1926
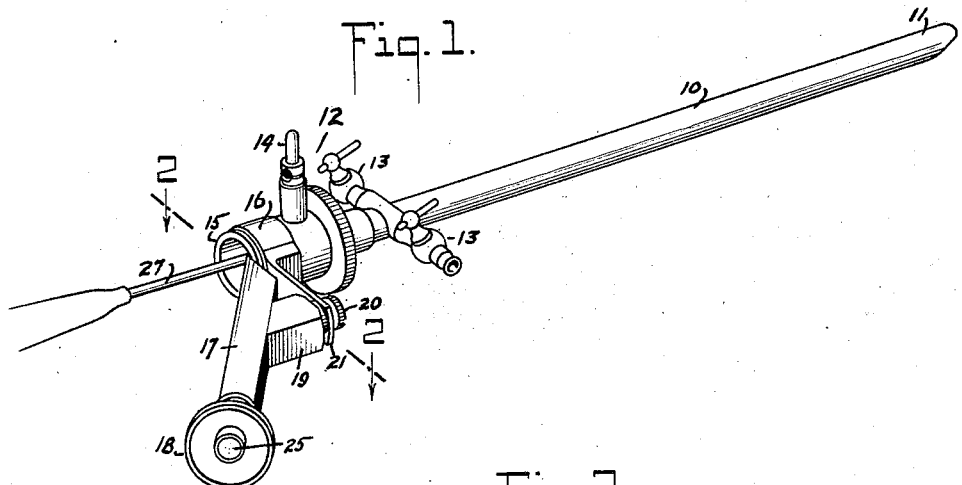
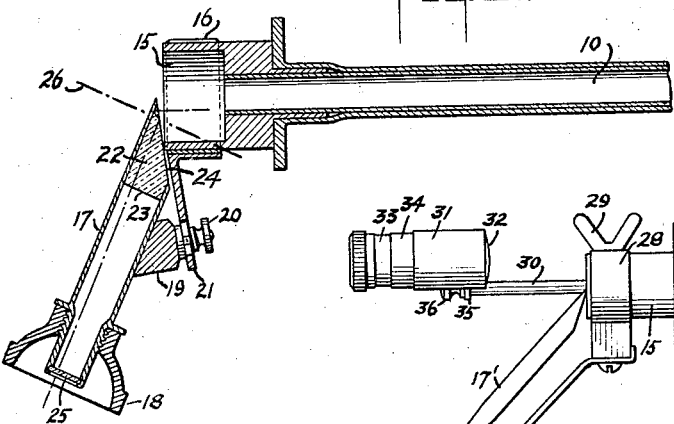
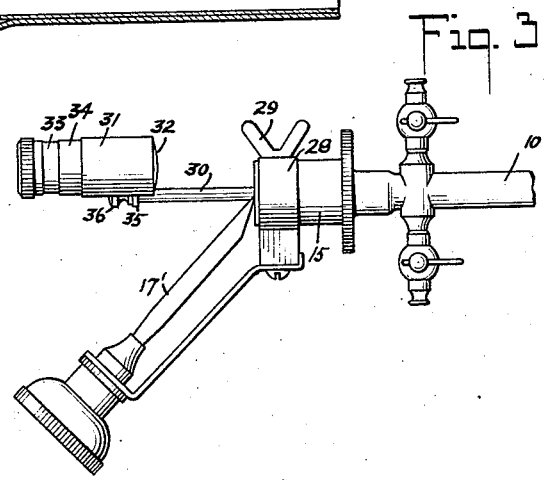
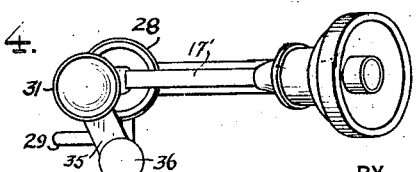
Reinhold H. Wappler
INVENTOR
BY
his ATTORNEY Patented Mar. 19, 1929.

1,705,513

UNITED STATES PATENT OFFICE.

REINHOLD H. WAPPLER, OF YONKERS, NEW YORK.

SPECULUM.

Application filed October 30, 1926. Serial No. 145,130.

My present invention relates generally to surgical instruments, and has particular reference to specula.

Although I have illustrated and shall hereinafter describe my invention as applied to an endoscope or similar instrument, nevertheless it will be understood that as to certain phases of my invention an application of this character is not essential.

There has always been considerable difficulty in making it possible for an operator to employ surgical instruments with an endoscope or similar device and to simultaneously observe the instrument in operation. The principal cause of the difficulty lies in the inconvenient location, for a purpose of this character, of the human eye. The exposed ends of endoscopes and similar devices are of necessity rather small, and the head of an operator consequently interferes in an annoying manner with the employment of an instrument where simultaneous observation is attempted.

Even where devices have been employed which shift or transfer the optical axis to a point spaced from the end of the tube, similar difficulties, complicated by the requirement that the visibility be erect and uninverted have arisen. I have found that any arrangement whereby the necessary positioning of the operator's head is such that his vision will be directed along a line parallel to the tube axis is beset with the further difficulty that the instrument must be controlled from a point alongside of the head. A position of this character is extremely uncomfortable and not conductive to accurate and delicate control.

It is therefore one object of the present invention to provide a device which permits the employment of an operating instrument in conjunction with an endoscopic or similar tube, and which permits simultaneous observation through the tube in a manner which is devoid of the difficulties illustrated by those specified. More particularly, it is an object of the invention to provide a device whose constituent parts are so arranged and constructed that a direct and uninverted view is rendered possible, while at the same time the relative positions of the operator's head, the instrument, and the tube are such as to render the simultaneous vision convenient and unannoying.

Another object of the invention is to provide the device in a form which permits the provision of the sight arrangement in the form of a removable attachment, thereby making it possible to achieve the advantages of my invention in conjunction with endoscopic tubes of any character and particularly of the large number which are already in use.

My invention embodies features which permit the simultaneous and independent observation by more than one person of certain steps of surgical operation, while at the same time permitting normal utilization of operating instruments.

One feature of the invention lies in providing an arrangement which leaves the normal size of the passageway through the endoscope, and the normally accessible open end thereof, practically unaffected and unimpaired. My invention contemplates the arrangement with an open-ended endoscopic tube of a sight device which is disposed wholly exteriorly of the endoscopic tube, which is entirely self-contained and which does not depend for its proper functioning upon any elements which are positioned within the tube; and in this way, the slight device, when provided in the form of a detachable unit, may be advantageously employed with any ordinary type of tube.

It is a feature of my invention to provide a device which produces an image in a plane which is non-perpendicular to the axis of the tube, thereby rendering it possible for the operator to look in a direction which forms an angle to the tube axis. In this way, his head may be entirely withdrawn from any positions wherein it may either interfere with the employment of instruments, be subjected to unpleasant discharges from the tube, or render the accurate control of the instruments difficult.

Another feature of the invention lies in providing the sight device in a structural form which necessitates the interposition of only a negligible portion thereon in the path of the light rays emanating from the endoscopic tube. My invention contemplates the provision of a reflecting prism so arranged and constructed as to permit the interposition of only an extreme edge portion thereof in the path of the light rays to effect the complete collation of all the light rays necessary to thereafter produce the desired image.

A preferred form of the invention contemplates the provision of an attaching portion such as a collar, this portion being mountable or disposable upon the end of an endoscopic tube, and a sight device or optical instrument in the form of a tubular element mounted upon the collar and disposed at an angle to the tube axis. The nature of my invention is such that the eyepiece at the end of the tubular element will be arranged in a plane which is non-perpendicular to the tube axis and which may in fact be perpendicular to the tubular element axis.

A modified form of the invention, particularly where it is desired to utilize certain features thereof for instruction purposes, embodies a second optical instrument in the form of a telescope or similar magnifying instrument whereby it is possible to interpose elements in an out-of-focus manner in the path of the telescope without impairing the vision therethrough.

Other features of the invention lie in the particular arrangement of parts and the structural natures of the sight devices referred to. In general, it is an object of the invention to provide a device which is extremely simple of construction, hence inexpensive from the standpoint of manufacture and easy to manipulate; which enables the provision of an easily attachable and detachable device from an endoscope or speculum of ordinary characteristics; and which is extremely efficient in fulfilling the functions contemplated.

For the attainment of the foregoing objects and such other objects as may hereinafter appear or be pointed out, I have illustrated two forms of my invention in the accompanying drawings in which—

Fig. 1 is a perspective view of an endoscopic tube device embodying the features of my invention;

Fig. 2 is an enlarged plan view, in cross section along the line 2—2 of Fig. 1, showing the essential elements of my device;

Fig. 3 is a plan view of a modification; and

Fig. 4 is an end view of Fig. 3, this view being taken in the direction of the tube axis.

Referring now to the drawings, and particularly to Fig. 1, it will be observed that I have shown my invention as applied to an instrument which comprises an endoscopic tube 10 having a forward portion 11 provided with a fenestral opening (not shown) and provided with a rear portion denoted generally by the reference numeral 12. The rear portion may embody numerous instrumentalities and connections, depending upon the particular functions of the instrument, such as the pet-cocks 13, the electrical terminal 14, etc.; but in any event, it is contemplated that the instrument with which my invention will be employed will embody an end 15 which will serve as a source of association between the tube proper and the sight device or devices of the invention.

It is contemplated that surgical instruments will be insertable through the end 15 in order to perform certain surgical operations at the end 11. In other words, it will be understood that the endoscopic tube will be one which may be positioned within a body cavity for the purpose of utilizing such operating instruments, and not for the sole purpose of examining the interior of the cavity. However, it is of course possible to employ a hollow tube of this character for purposes of mere inspection as well as for purposes of operation.

My invention contemplates the provision of an arrangement which will permit observation to take place and be sustained even during the periods when operating instruments are being employed; and to permit such observation to be partaken of in a manner which does not necessitate the positioning of the observer's head in any inconvenient or unpleasant manner. Furthermore, the arrangement is such that observation may be had by more than one person during the operating procedure.

In the embodiment shown in Figs. 1 and 2, I have shown my invention in a form which comprises an attachable unit, this unit having an attaching portion in the form of a spring collar or clip 16 and a sight device 17 associated with the collar 16. The sight device is a substantially tubular element which may be rectangular in cross-section, which may have an eyepiece 18 associated with its outer end, and which is suitably associated with the collar 16 by means of a strut 19, an adjustable screw 20, and an arm 21 extending from the collar 16.

Reference to Figure 2 will show more clearly the structural nature of the sight device 17. It will be observed that its arrangement is such as to dispose its axis at an angle to the axis of the tube 10, and that the eyepiece 18 is arranged upon its outer end in a plane substantially perpendicular to the axis of the element 17. Associated with the inner end of the element 17 is a double reflecting prism 22 whose rear wall 23 is substantially perpendicular to the axis of the element 17, whose side walls fit snugly within the element 17, and whose forward wall or face 24 is arranged in a plane forming an angle of approximately 45° with the face 23. The walls of the element 17 are suitably beveled at their inner ends so as to conform to the exposed face 24 of the prism 22.

An arrangement of this character renders it possible to collect and transmit all the light rays emanating from the endoscopic tube by simply inserting the extreme end of the prism 22 into the path of these rays. The latter will encounter first the exposed face 24 of the prism, will pass through this face, and strike the rear wall of the prism; they will then be reflected to the forward face 24 and will strike the latter at an angle which will cause their re-reflection by internal reflection in a direction which sends them outwardly through the tube 17. At the end of the latter there may be provided a plain piece of glass 25 forming with the cup-shaped device illustrated the complete eyepiece 18.

The double reflecting properties of the prism 22 will cause the image transmitted thereby to be erect and uninverted, and it will be observed that this image is produced in a plane indicated roughly by the dotted line 26, this plane forming an angle less than 90° with the axis of the tube 10. It is the provision of the erect image in a plane of this character which results in the advantageous features of the invention; and the reason for this is that the image may be observed by directing the line of sight of the human eye in a direction perpendicular to this plane, i. e., in the direction of the axis of the element 17 as contradistinguished from a direction which is substantially parallel to the axis of the tube 10.

By virtue of the very slight amount of the prism 22 which must be interposed in the path of the light rays emerging from the tube 10 in order to produce the desired image referred to, the opening at the exposed end of the endoscopic tube is left practically unobstructed. Furthermore, the arrangement of the sight device is such that it is entirely self-contained and does not depend for its functioning upon any portions within the tube 10. In this way, the full cross-sectional size of the passageway through the tube 10 is left available for operating instruments which may be inserted and removed with ordinary facility through the open end.

For illustrative purposes, I have shown the outer end of an instrument 27 extending into the tube 10 for the purpose of performing certain operations at the inner end 11. For the sake of clearness, the device has been illustrated in a manner which renders the instrument 27 operable and controllable by the left hand of an operator having his eye at the eyepiece 18, although it will be understood that by merely inverting the instrument, or the sight device 17, the instrument 27 would be manipulable by an operator's right hand. It will be obvious that an operator having, let us say, his left eye at the eyepiece 18 of Fig. 1 would be able to manipulate the instrument 27 with great ease, because of the fact that the instrument is in front of him and not alongside of his head. Furthermore, it will be obvious that his head will be entirely out of the way and will not in any way interfere with or render difficult the proper control of the instrument 27. And it will also be obvious that direct vision may be had through the tube 10 by a student or a second observer if such added observation is desired.

In Figs. 3 and 4 I have illustrated a modification which will facilitate the observation by two parties during the use of the operating instruments. In this embodiment, the attaching collar 28 is of a character to be clamped over the end 15 by means of a wing nut 29. The structural nature of the device 17' is slightly different from that of the device 17, although essentially the same. Carried by the collar 28 is an additional axial arm 30 upon whose outer end is mounted an optical device in the form of a telescope 31. I have shown this device in the form of a cylindrical element having a convex lens 32 at its forward end and having telescopically adjustable components 33 and 34 for permitting the device to be focused. The entire device is adjustably mounted upon the arm 30, and I have illustratively shown a supporting bracket 35 having an opening in its outer end through which the arm 30 projects, the latter being provided with a tightening knob 36 which will position the bracket 35 in any radial position with respect to the arm 30.

It will be observed that the telescope 31 is spaced from the end of the endoscopic tube and that its axis is arranged parallel to the axis of the endoscope. The nature of the mounting 30 permits the telescope to be adjusted into a plurality of positions parallel to the position shown, i. e., parallel to the axis of the endoscope. The optical nature of the telescope permits visibility therethrough to remain unimpaired even in adjusted positions other than a position concentric with the endoscopic tube 10. As a matter of fact, the bracket 35 may be swung through approximately 90° without having the visibility through the telescope impaired. Thus, referring to Fig. 4, the telescope has been offset to the left, yet observation will be possible therethrough of the full fenestral opening.

The optical nature of the telescope has an added advantage in the present instance because of the fact that when focused for the fenestral opening all objects or elements directly in front of the telescope, such as the interposed tip of the element 17', will be out of focus and will therefore have no effect upon the view through the telescope.

It will now be observed that the arrangement I have provided in Figs. 3 and 4 is such as to permit free utilization of the operating instruments during sustained observation by more than one person. The nature of the device 17' is such that only its extreme end portion projects across a fractional portion of the open end of the tube 10; and the nature of the device 31 is such as to permit displacement thereof (without impairing visibility therethrough) sufficiently to permit free access to the end of the endoscope. Thus, the operator or instructor may continue to use the device 17' where his head is safely out of the path of unpleasant discharges, while a second observer or student may observe the operations by means of the telescope 31. In this way the student may jump aside if necessary, whereas the operator who is controlling the instruments may uninterruptedly continue his work.

Where desired, additional sight devices similar to the device 17' may be provided so as to permit more than one additional person to have observation.

It will thus be observed that I have shown a device which is highly efficient, yet simple of construction. Its arrangement and construction renders it possible to provide the sight portion thereof in the form of a readily attachable and detachable unit. The device also will be of extreme benefit both to the medical profession and to mankind in general for the reason that operations, regardless of character, may be performed under sustained observation. Furthermore, the operations will be performable in a manner which is not an inconvenience and source of annoyance to the operator and which will therefore, result in better and more accurate operative steps.

Many of the details herein described for the purpose of explaining the nature of my invention may be altered by those skilled in the art without departing from the spirit and scope of the invention. Thus, the sight devices may be arranged and constructed so as to project at varying angles from the end of the endoscopic tube. The manner of mounting these devices upon the endoscopic tube will vary to suit requirements. The exact structural nature of the sight devices need not necessarily be as depicted in the drawings. Other details of construction may be similarly varied to suit varying requirements, and it is therefore intended that these details, as they may appear in the appended claims, be interpreted as illustrative and not in a limiting sense.

Having thus described my invention and illustrated its use, what I claim as new and desire to secure by Letters Patent is—

1. In a device of the character described, an endoscopic tube having an open end for the passage of an operating instrument through the tube, and means for permitting an operator to look through the tube during the employment of said instrument, said means comprising a sight device associated with the tube in a manner which leaves said opening accessible, and said means being arranged and constructed to form a final image of the tube interior in a plane forming an angle other than 90° to the tube axis, whereby the observing operator's head will not interfere with the employment of said instrument.

2. In a device of the character described, an endoscopic tube having an open end for the passage of an operating instrument through the tube, and a sight device associated with the tube for permitting an operator to look through the tube during the employment of said instrument, said device comprising a hollow element having a double reflecting prism at one end and said end being so positioned that the light rays emanating from the tube will be directed through said element by said prism, whereby an erect image of the tube interior will be visible to an operator looking directly into said hollow element.

3. In a device of the character described, an endoscopic tube having an open end for the passage of an operating instrument through the tube, and a sight device associated with the tube for permitting an operator to look through the tube during the employment of said instrument, said device comprising a tubular element extending at an angle away from said open end and having a light-receiving prism arranged in its inner end, said inner end being so positioned that the light rays emanating from the tube will be directed through said element by said prism.

4. As a removable attachment for an endoscopic tube having an opening for the passage of an operating instrument through the tube, a sight device comprising a tubular element having an eyepiece at one end arranged substantially perpendicularly to said element, and having a prism at the opposite end arranged and constructed in a manner which permits an edge portion thereof to collect and transmit the rays emerging from the endoscopic tube through said element to the eyepiece.

5. As a removable attachment for an endoscopic tube having an opening for the passage of an operating instrument through the tube, a sight device comprising a tubular element having an eyepiece at one end and arranged substantially perpendicularly to said element, and having a double reflecting prism at its other end, said prism being arranged and constructed in a manner which permits an edge portion thereof to collect and transmit the rays emerging from the endoscopic tube through said element to the eye piece, whereby said prism will produce an erect and uninverted image which will be visible through said eyepiece.

6. As a removable attachment for an endoscopic tube, a sight device comprising an attaching portion adapted to be applied to the end of the endoscopic tube, and a tubular element carried by said attaching portion and extending at an angle from said tube end, said tubular element having an eyepiece at its outer end arranged in a plane substantially perpendicular to the axis of said element, and having optical means associated with its inner end for rendering an erect image of the tube interior visible through said eyepiece.

7. As a removable attachment for an endoscopic tube, a sight device comprising an attaching portion adapted to be applied to the end of the endoscopic tube, and a tubular element carried by said attaching portion and extending at an angle from said tube end, said tubular element having an eyepiece at its outer end arranged in a plane substantially perpendicular to the axis of said element, and having optical means associated with its inner end for rendering an erect image of the tube interior visible through said eyepiece, said optical means comprising a prism having an inner face parallel to the eyepiece and an outer face forming an angle therewith.

8. In a device of the character described, an endoscopic tube having an open end for insertion of an operating instrument, and a sight device associated with said end and comprising a tubular element extending at an angle from said end, said element being arranged and constructed to project only a portion of its inner end across said open end, thereby leaving the major portion of said open end accessible, and optical means associated with said inner end for collecting the light rays emerging from the endoscopic tube and transmitting them in an erect manner through said element.

9. In a device of the character described, an endoscopic tube having an open end for insertion of an operating instrument, and a sight device associated with said end and comprising a tubular element extending at an angle from said end, said element being arranged and constructed to project only a portion of its inner end across said open end, thereby leaving the major portion of said open end accessible, and optical means associated with said inner end for collecting the light rays emerging from the endoscopic tube and transmitting them in an erect manner through said element, said means comprising a double reflecting prism having an attenuated edge portion arranged in the path of said light rays.

10. The combination with an endoscopic tube, of a plurality of independent sight devices associated therewith in a manner which permits simultaneous observation into the tube through each thereof, one of said devices comprising a telescope adjustable toward and away from concentric alignment with the tube.

11. The combination with an endoscopic tube, of a plurality of independent sight devices associated therewith in a manner which permits simultaneous observation into the tube through each thereof, one of said devices comprising a telescope spaced from the tube end and adjustable into a plurality of positions wherein its axis is substantially parallel to that of the tube.

12. The combination with an endoscopic tube, of a telescope spaced from the tube end and adjustable relative to the axis of the tube, said telescope being of a structural nature which permits desired observation therethrough in a number of adjusted positions, whereby the tube opening may be rendered freely accessible for normal utilization, during said observation, of operating instruments.

13. The combination with an endoscopic tube, of a plurality of independent sight devices associated therewith in a manner which permits simultaneous observation into the tube through each thereof, one of said devices comprising a telescope spaced from the tube, and another of said devices comprising a tubular element having an end thereof interposed into the space between the telescope and the tube.

14. As a removable attachment for an endoscopic tube, a unit comprising a plurality of independent sight devices so constructed and arranged as to permit simultaneous observation through each thereof of the tube interior, and to also permit normal utilization of operating instrumentalities within the tube, when the unit is attached.

15. As a removable attachment for an endoscopic tube having an open end for the passage of operating instruments, a unit comprising an attaching portion, and a sight device associated with said portion and so constructed and arranged with respect to said portion that when the unit is attached the tube end will remain accessible for normal utilization of operating instruments.

16. As a removable attachment for an endoscopic tube having an open end for the passage of operating instruments, a unit comprising an attaching portion, and a sight device associated with said portion and so constructed and arranged with respect to said portion that when the unit is attached the tube end will remain accessible for normal utilization of operating instruments, said device comprising an unbent tubular element having an eyepiece end and a light-receiving end, the latter end having a portion thereof projecting only partially into the path of the light rays emerging from the tube.

17. In a device of the character described, an endoscopic tube having an open end for the passage of an operating instrument through the tube, and means for permitting an operator to look through the tube during the employment of said instrument, said means comprising a sight device arranged in its entirety exteriorly of the tube and behind said open end, said sight device having a light-receiving inner end which extends very slightly across said open end, and optical means associated with said inner end for receiving the light rays emanating from said open end and transmitting them through said device.

In witness whereof, I have signed this specification this 28th day of Oct., 1926.

REINHOLD H. WAPPLER.